(12) United States Patent
Niu et al.

(10) Patent No.: US 11,921,499 B2
(45) Date of Patent: Mar. 5, 2024

(54) MULTI-PARAMETER DYNAMIC SAMPLING METHOD AND MULTI-PARAMETER DYNAMIC SAMPLING DEVICE

(71) Applicant: Siemens Aktiengesellschaft, Munich (DE)

(72) Inventors: Zhu Niu, Beijing (CN); Bo Wen, Beijing (CN); Shun Jie Fan, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 18/005,983

(22) PCT Filed: Jul. 21, 2020

(86) PCT No.: PCT/CN2020/103330
§ 371 (c)(1),
(2) Date: Jan. 19, 2023

(87) PCT Pub. No.: WO2022/016389
PCT Pub. Date: Jan. 27, 2022

(65) Prior Publication Data
US 2023/0273611 A1  Aug. 31, 2023

(51) Int. Cl.
G05B 23/02       (2006.01)
G05B 19/042      (2006.01)

(52) U.S. Cl.
CPC ..... G05B 23/0221 (2013.01); G05B 19/0426 (2013.01)

(58) Field of Classification Search
CPC .................. G05B 23/0221; G05B 19/0426
See application file for complete search history.

(56) References Cited

U.S. PATENT DOCUMENTS 8,107,515 B2 *  1/2012  Cannon ............. H04L 1/0071
                                          370/464
9,509,994 B2 * 11/2016  Ivanov .............. H04N 19/61
(Continued)

FOREIGN PATENT DOCUMENTS

CN    105 372 515    3/2016    ............ G01R 31/00
CN    105 373 118    3/2016    ............ G05B 23/02
(Continued)

OTHER PUBLICATIONS

Search Report for International Application No. PCT/CN2020/103330, 11 pages, dated Apr. 20, 2021.
(Continued)

*Primary Examiner* — Mohammad K Islam
(74) *Attorney, Agent, or Firm* — Slayden Grubert Beard PLLC (57) ABSTRACT

The present disclosure describes multi-parameter dynamic sampling methods and systems. An example method includes: configuring two sampling rates for each parameter in a set of sampling parameters; selecting one of the sampling rates for each parameters to sample it; calculating a load for each parameter at the selected sampling rate, sorting the parameters according to the loads, and determining high-loaded parameters according to a sorting result; and determining whether each parameter has data loss, and if at least one of the sampling parameters has data loss, performing down-sampling on the high-loaded sampling parameters within a range of the configured at least two sampling rates.

17 Claims, 4 Drawing Sheets

(56) References Cited

U.S. PATENT DOCUMENTS

| | | | |
|---|---|---|---|
| 10,264,999 B2* | 4/2019 | Lacirignola | A61B 5/125 |
| 11,032,576 B2* | 6/2021 | Kennett | H04N 19/59 |
| 11,330,280 B2* | 5/2022 | Da Silva Pratas Gabriel | H04N 19/11 |
| 2011/0119523 A1 | 5/2011 | Bisdikian et al. | 714/2 |
| 2014/0195199 A1 | 7/2014 | Uluyol | G06F 17/00 |
| 2014/0198669 A1 | 7/2014 | Brown et al. | 370/250 |
| 2015/0074258 A1 | 3/2015 | Ferreira et al. | 709/224 |
| 2015/0199917 A1 | 7/2015 | French et al. | 434/247 |
| 2016/0041217 A1 | 2/2016 | Lee | G01R 31/021 |
| 2017/0342962 A1 | 11/2017 | Uluyol | F03D 7/04 |
| 2019/0058641 A1 | 2/2019 | Mirzazad et al. | |
| 2019/0172230 A1* | 6/2019 | Mailhe | G06T 5/002 |
| 2020/0133256 A1 | 4/2020 | Cella | G05B 23/0294 |

FOREIGN PATENT DOCUMENTS

| | | | |
|---|---|---|---|
| CN | 110 474 812 | 11/2019 | H04L 12/24 |
| WO | 2016/122708 A1 | 8/2016 | |

OTHER PUBLICATIONS

Extended European Search Report, Application No. 20945959.3, 10 pages.

\* cited by examiner

| Port | Parameter A | Parameter B | Parameter C | ...... |
|---|---|---|---|---|
| 1 | N | N | N | |
| 2 | N | Y | Y | |
| 3 | Y | Y | Y | |
| 4 | Y | Y | Y | |
| 5 | Y | Y | Y | |
| 6 | Y | Y | Y | |
| 7 | Y | Y | Y | |
| 8 | Y | Y | Y | |

MULTI-PARAMETER DYNAMIC SAMPLING METHOD AND MULTI-PARAMETER DYNAMIC SAMPLING DEVICE

CROSS-REFERENCE TO RELATED APPLICATIONS

This application is a U.S. National Stage Application of International Application No. PCT/CN2020/103330 filed Jul. 21, 2020, which designates the United States of America, the contents of which are hereby incorporated by reference in their entirety.

TECHNICAL FIELD

The present disclosure mainly relates to the field of industrial automation. Various embodiments of the teachings herein include a multi-parameter dynamic sampling methods and/or devices.

BACKGROUND

The Internet of Things is widely used in the field of industrial automation, and is generally understood to include terminal devices, an intelligent gateway, and a cloud server. The intelligent gateway is connected to a plurality of terminal devices, acquires a plurality of parameters of the plurality of terminal devices at a preset period, and then sends a data packet composed of the parameters to the cloud server, and the cloud server analyzes and processes the data packet.

In practical application, the number of the terminal devices connected with the intelligent gateway is quite large, parameters of each terminal device have different sampling rates, and the sampling rates of some parameters are very high (the sampling period is less than 1 second). However, a large number of parameters with high sampling rates occupy a large number of resources of the terminal devices and affect normal operation of the terminal devices. As a result, the response of the terminal devices to a message is slow, and all the parameters cannot be acquired in a preset acquisition period, resulting in data loss, which is not conductive to data analysis and fault diagnosis on the cloud side. In addition, because the processing capacity of the intelligent gateway is limited, sampling parameters with high sampling rates, or with a large number of sub-parameters, or being too long, or retried repeatedly lead to overload of the intelligent gateway, data loss, or even a system crash.

SUMMARY

In order to solve the above technical problems, the present disclosure describes multi-parameter dynamic sampling methods and/or devices which can dynamically adjust sampling rates of parameters, avoid data loss and improve sampling reliability. For example, some embodiments of the teachings herein include a multi-parameter dynamic sampling method including: configuring at least two sampling rates for each of sampling parameters in a plurality of parameters; selecting one of the at least two sampling rates of each of the sampling parameters to sample the corresponding sampling parameter; calculating a load of each of the sampling parameters at the selected sampling rate, sorting the sampling parameters according to the loads, and determining high-loaded sampling parameters according to a sorting result; and determining whether all the sampling parameters have data loss or not, and if at least one of the sampling parameters has data loss, performing down-sampling on the high-loaded sampling parameters within a range of the configured at least two sampling rates. Therefore, when the sampling parameters have data loss, performing down-sampling on the high-loaded parameters within the range of the configured at least two sampling rates can reduce the total load, avoid data loss, and improve sampling reliability.

In some embodiments, the method further includes: determining low-loaded sampling parameters according to the sorting result, and if no sampling parameter has data loss, performing up-sampling on the low-loaded sampling parameters within the range of the configured at least two sampling rates. Therefore, when no data loss occurs, performing up-sampling on the low-loaded sampling parameters can accelerate the process of sampling the low-loaded sampling parameters and improve sampling efficiency.

In some embodiments, the configuring the priority for each of the sampling parameters includes: configuring the priority for each of the sampling parameters, and fixing a sampling rate of the sampling parameter with the highest priority.

In some embodiments, the configuring the priority for each of the sampling parameters includes: acquiring the priorities of the sampling parameters from a cloud server. Therefore, it can be ensured that the sampling rate of the sampling parameter with the highest priority is not adjusted, thereby improving the sampling safety.

In some embodiments, after the configuring the at least two sampling rates for each of the sampling parameters, the method includes: calculating a load of each of the sampling parameters at the lowest sampling rate, calculating a total load according to the load of each of the sampling parameters, comparing the total load with a preset value, and displaying overload prompt information if the total load is greater than the preset value. Therefore, by displaying the overload prompt information when the total load of each of the sampling parameters at the lowest sampling rate is greater than the preset value, a user can be prompted that current parameter configuration still exceeds a system load, and the user can reconfigure the at least two sampling rates of the sampling parameters according to the overload prompt information so as to avoid data loss.

In some embodiments, the method further includes: sorting the sampling parameters according to the loads at the lowest sampling rate, and displaying a sorting result of the sampling parameters. Therefore, by displaying the sorting result of the sampling parameters sorted according to the loads at the lowest sampling rate, the user can preferentially adjust the sampling rates of the sampling parameters with larger loads according to a load condition, so that the adjusting efficiency is improved.

In some embodiments, whether all the sampling parameters have data loss or not is determined, and if at least one of the sampling parameters has data loss, down-sampling is performed on the parameter with the highest load within the range of the configured at least two sampling rates. Therefore, by adjusting the sampling rate of the sampling parameter with the highest load, the complexity can be reduced, and the sampling stability can be improved.

In some embodiments, the determining whether all the sampling parameters have data loss or not includes: checking a sampling result at a preset period, and if a sampling parameter having no change in state exists during checking, determining that the sampling parameter has data loss.

Therefore, whether all the sampling parameters have data loss or not can be quickly determined.

As another example, some embodiments include a multi-parameter dynamic sampling device with: a configuration unit, configured to configure at least two sampling rates for each of sampling parameters in a plurality of parameters; a sampling unit, configured to select one of the at least two sampling rates of each of the sampling parameters to sample the corresponding sampling parameter; a calculation unit, configured to calculate a load of each of the sampling parameters at the selected sampling rate, sort the sampling parameters according to the loads, and determine high-loaded sampling parameters according to a sorting result; and an adjustment unit, configured to determine whether all the sampling parameters have data loss or not, and if at least one of the sampling parameters has data loss, perform down-sampling on the high-loaded sampling parameters within a range of the configured at least two sampling rates.

In some embodiments, the calculation unit further determines low-loaded sampling parameters according to the sorting result, and if no sampling parameter has data loss, the adjustment unit further performs up-sampling on the low-loaded sampling parameters within the range of the configured at least two sampling rates.

In some embodiments, the configuration unit configuring a priority for each of the sampling parameters includes: configuring the priority for each of the sampling parameters, and fixing a sampling rate of the sampling parameter with the highest priority.

In some embodiments, the configuration unit configuring the priority for each of the sampling parameters includes: acquiring the priorities of the sampling parameters from a cloud server.

In some embodiments, after configuring the at least two sampling rates for each of the sampling parameters, the configuration unit is configured to: calculate a load of each of the sampling parameters at the lowest sampling rate, calculate a total load according to the load of each of the sampling parameters, compare the total load with a preset value, and display overload prompt information if the total load is greater than the preset value.

In some embodiments, the configuration unit is further configured to: sort the sampling parameters according to the loads at the lowest sampling rate, and display a sorting result of the sampling parameters.

In some embodiments, the adjustment unit determines whether all the sampling parameters have data loss or not, and performs down-sampling on the parameter with the highest load within the range of the configured at least two sampling rates if at least one of the sampling parameters has data loss.

In some embodiments, the adjustment unit determining whether all the sampling parameters have data loss or not includes: checking a sampling result at a preset period, and if a sampling parameter having no change in state exists during checking, determining that the sampling parameter has data loss.

As another example, some embodiments include an intelligent gateway, including a processor, a memory and instructions stored in the memory, where the instructions, when executed by the processor, implement one or more of the methods described herein.

As another example, some embodiments include a computer readable storage medium, having computer instructions stored thereon, where the computer instructions, when executed, implement one or more of the methods as described herein.

BRIEF DESCRIPTION OF THE DRAWINGS

The accompanying drawings below are merely intended to provide exemplary descriptions and explanations for teachings of the present disclosure, but are not intended to limit the scope of the present disclosure. In the figures.

LIST OF REFERENCE NUMERALS

100 Internet of Things system
110 Terminal device
120 Intelligent gateway
130 Cloud server
200 Multi-parameter dynamic sampling method
S210-S240 Step
300 Sampling result
400 Multi-parameter dynamic sampling device
410 Configuration unit
420 Sampling unit
430 Calculation unit
440 Adjustment unit

DETAILED DESCRIPTION

To provide a clearer understanding of the technical features, objectives, and effects of the teachings of the present disclosure, specific implementations are described with reference to the accompanying drawings. In the following description, many specific details are provided to give a full understanding. However, the teachings may also be implemented in other manners different from those described herein. Therefore, the scope of the present disclosure is not limited to the specific embodiments disclosed herein.

As shown in this application and the claims, terms such as "one", "a", "an", and/or "the" do not merely represent singular forms, and may also include plural referents unless the context clearly indicates an exception. Generally, terms "include" and "comprise" merely indicate including clearly identified steps and elements, and these steps and elements do not constitute an exclusive list. A method or device may also include other steps or elements.

Figure 1:
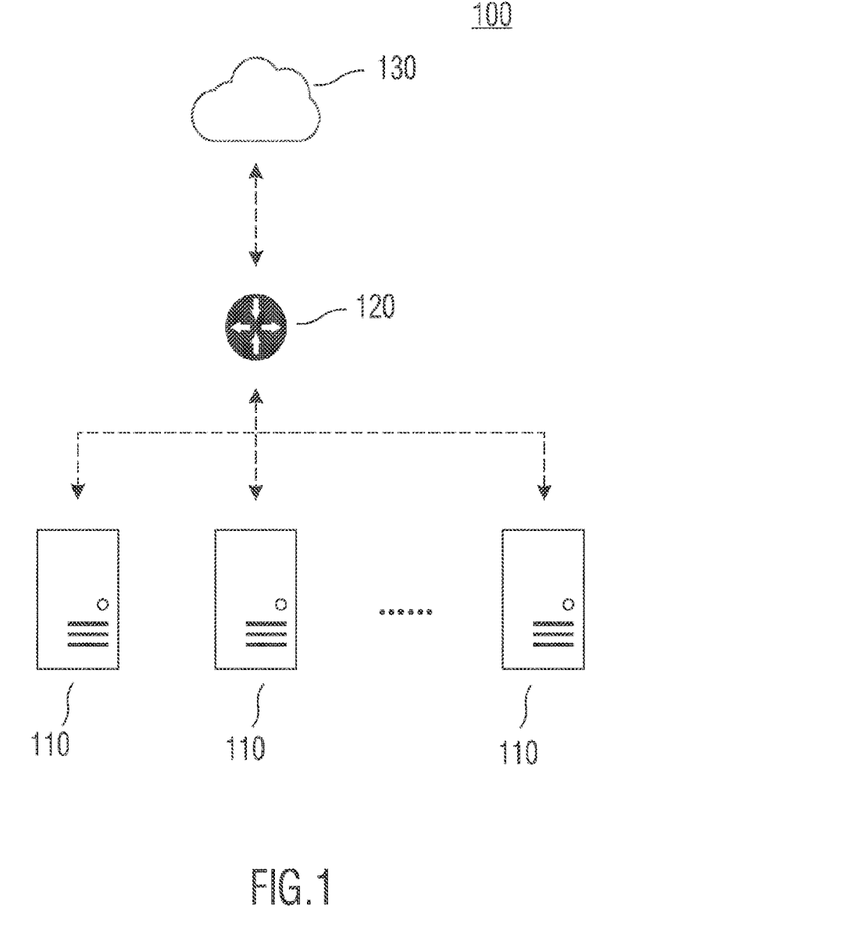
FIG. 1 is a schematic structural diagram of an Internet of Things system incorporating teachings of the present disclosure.

FIG. 1 is a schematic structural diagram of an Internet of Things system 100 incorporating teachings of the present disclosure. As shown in FIG. 1, the Internet of Things system 100 includes a terminal device 110, an intelligent gateway 120, and a cloud server 130. The intelligent gateway 120 is connected to a plurality of terminal devices, and the intelligent gateway 120 is also connected to the cloud server 130. The intelligent gateway 120 sends a request message to the terminal device 110 at a preset period, and the terminal device 110 returns a result message to the intelligent gateway 120, so that a plurality of parameters of the plurality of terminal devices 110 are acquired. The plurality of parameters form a data packet, the intelligent gateway 120 sends the data packet to the cloud server 130, and the cloud server 130 analyzes and processes the data packet. The plurality of terminal devices 110 may generate a plurality of identical or different parameters.

In practical application, the number of the terminal devices 110 connected to the intelligent gateway 120 is quite large, the parameters of each terminal device 110 have different sampling rates, and the sampling rates of some parameters are very high (a sampling period is less than 1 second). However, a large number of parameters with high sampling rates occupy a large number of resources of the terminal device 110 and affect normal operation of the terminal device 110. As a result, the response of the terminal device 110 to a message is slow, and all the parameters cannot be acquired in a preset acquisition period, resulting in data loss, which is not conductive to data analysis and fault diagnosis at the cloud server 130. In addition, because the processing capacity of the intelligent gateway 120 is limited, sampling parameters with high sampling rates, or with a large number of sub-parameters, or being too long, or retried repeatedly may lead to overload of the intelligent gateway 120, data loss, or even a system crash of the Internet of Things system 100. The teachings of the present disclosure enable multi-parameter dynamic sampling method and multi-parameter dynamic sampling devices, which can dynamically adjust sampling rates of parameters, avoid data loss and improve the acquisition reliability.

Figure 2:
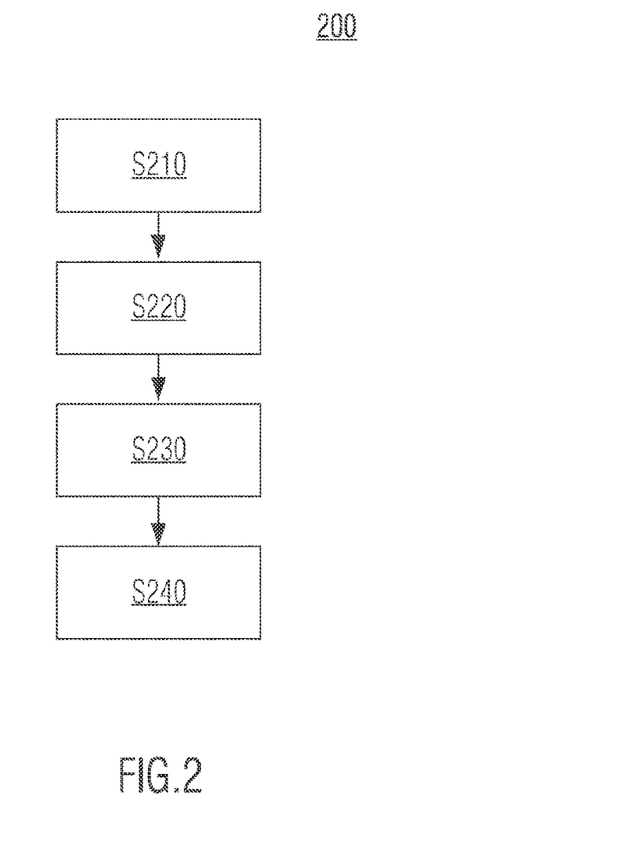
FIG. 2 is a flow chart of a multi-parameter dynamic sampling method incorporating teachings of the present disclosure.

FIG. 2 is a flow chart of a multi-parameter dynamic sampling method incorporating teachings of the present disclosure. The method may be implemented in the Internet of Things system shown in FIG. 1. It may be understood that the dynamic sampling method in the present invention is not limited thereto and may also be applied to other parameter acquisition scenarios. As shown in FIG. 2, the dynamic sampling method includes:

Step S210, at least two sampling rates are configured for each of sampling parameters in a plurality of parameters. In this step, at least two sampling rates are configured for each of the sampling parameters, and the sampling parameters may be sampled at any one of the configured at least two sampling rates. The at least two sampling rates configured for the sampling parameters may be manually input by a user or may be automatically acquired according to historical information. In some cases, one part of the at least two sampling rates configured for the sampling parameters is input manually by the user, while the other part is automatically acquired according to the historical information. It is noted that the sampling rates and a sampling period are reciprocals of each other, and the sampling rates may be configured directly or may be configured through the sampling period. For the ease of description, the present invention uses sampling rates uniformly. As a non-limiting example, three sampling rates of 50 Hz, 100 Hz, and 200 Hz may be configured for a sampling parameter, which is temperature of a terminal device 110.

In some embodiments, a priority is configured for each of the sampling parameters and a sampling rate of the sampling parameter with the highest priority is fixed. The priorities of the sampling parameters increase with importance of the sampling parameters, i.e. the higher the importance of the sampling parameters, the higher their priorities. For the sampling parameter with the highest priority, its sampling rate is fixed, i.e. its sampling rate is not adjustable. Through such a configuration, it can be ensured that the sampling rate of the sampling parameter with the highest priority is not adjusted, thereby improving the sampling safety. The priority configured for each of the sampling parameters may be manually input by the user.

In some embodiments, the configuring the priority for each of the sampling parameters may include: acquiring the priorities of the sampling parameters from a cloud server. Priorities configured for the sampling parameters by other users are stored on the cloud server, and automatic acquisition of the priorities of the sampling parameters can be realized by acquiring the priorities of the sampling parameters from the cloud server. In addition, the cloud server analyzes and processes the priorities of the sampling parameters configured by a plurality of users, improving the accuracy of the push priorities.

In some embodiments, after the configuring the at least two sampling rates for each of the sampling parameters, the method includes: calculating a load of each of the sampling parameters at the lowest sampling rate, calculating a total load according to the load of each of the sampling parameters, comparing the total load with a preset value, and displaying overload prompt information if the total load is greater than the preset value.

After the at least two sampling rates are configured for each of the sampling parameters, if the total load of each of the sampling parameters at the lowest sampling rate still exceeds the preset value, the system is still overloaded, and fails to acquire part of the sampling parameters, resulting in data loss, and affecting system performance. By displaying the overload prompt information when the total load of each of the sampling parameters at the lowest sampling rate is greater than the preset value, the user can be prompted that current parameter configuration still exceeds a system load, and the user can reconfigure the at least two sampling rates of the sampling parameters according to the overload prompt information so as to avoid data loss.

In some embodiments, the load of each of the sampling parameters at the lowest sampling rate may be calculated by equation (1) and the total load of each of the sampling parameters at the lowest sampling rate may be calculated by equation (2):

$$L_{n,min} = \frac{A*e + B*h + \sum_{i=1}^{h}(C*l)}{D*T_{max}} * \frac{ll*10}{100} \quad (1)$$

$$La = \sum_{n=1}^{N} L_{n,min} \quad (2)$$

where $L_{n,min}$ represents the load of parameters n at the lowest sampling rate, e represents an average number of retries of the parameters n, h represents the number of sub-parameters i of the parameters n, 1 represents a word length of the sub-parameters i, ll represents a priority of the parameters n, $T_{max}$ represents a maximum sampling period (corresponding to the lowest sampling rate) of the parameters n, N represents the number of the parameters n, La represents the total load of each of the sampling parameters at the lowest sampling rate, and A, B, C, D are constants.

In some embodiments, priority values may be set as eleven levels of 0, 1, 2, . . . , 8, 9 and 10. The lower the priority value, the higher the priority. The priority value of the sampling parameter with the highest priority is 0.

In some embodiments, after displaying the overload information, the method includes: sorting the sampling parameters according to the loads at the lowest sampling rate, and displaying a sorting result of the sampling parameters. By displaying the sorting result of the sampling parameters sorted according to the loads at the lowest sampling rate, the user can preferentially adjust the sampling rates of the sampling parameters with larger loads according to a load condition, improving the adjusting efficiency. Preferably, the sampling parameters may be sorted in order of the loads from large to small, the high-loaded parameters are located at a top, and the user may be more directly aware of the high-loaded sampling parameters.

Step S220, one of the at least two sampling rates of each of the sampling parameters is selected to sample the corresponding sampling parameter. The at least two sampling rates are configured for each of the sampling parameters in the above step, while one of the at least two sampling rates of each of the sampling parameters starts to be selected to sample each of the sampling parameters in this step, i.e. a request message is sent at the selected sampling rate. Taking acquiring a temperature at a selected sampling rate of 50 Hz as an example, an intelligent gateway 120 sends a request message 50 times per second, and the terminal device 110 returns a result message containing the temperature to the intelligent gateway 120 in response to the request message.

One of the at least two sampling rates of each of the sampling parameters is an initial sampling rate of each of the sampling parameters, which may be specified by the user or may be set automatically. It may set the lowest sampling rate of each of the sampling parameters as the initial sampling rate, it may also set the highest sampling rate of each of the sampling parameters as the initial sampling rate, or the initial sampling rate of each of the sampling parameters may be set by other rules. Preferably, the highest sampling rate of each of the sampling parameters is set as the initial sampling rate. For example, three sampling rates of 50 Hz, 100 Hz, and 200 Hz are configured for a sampling parameter, namely a temperature of the terminal device 110, and the highest sampling rate, namely 200 Hz may be set as the initial sampling rate.

Step S230, the load of each of the sampling parameters at the selected sampling rate is selected, the sampling parameters are sorted according to the loads, and the high-loaded sampling parameters are determined according to the sorting result. The load of each of the sampling parameters at the selected sampling rate can be calculated by equation (3):

$$L_n = \frac{A*e + B*h + \sum_{i=1}^{h}(C*l)}{D*T} * \frac{ll*10}{100} \quad (3)$$

where $L_n$ represents the load of parameters n, e represents an average number of retries of the parameters n, h represents the number of sub-parameters i of the parameters n, l represents a word length of the sub-parameters i, T represents a sampling period (corresponding to the selected sampling rate) of the parameters n, ll represents the priority of the parameters n, and A, B, C and D are constants.

In some embodiments, priority values may be set as eleven levels of 0, 1, 2, . . . , 8, 9 and 10. The lower the priority value, the higher the priority. The priority value of the sampling parameter with the highest priority is 0. For a parameter with the highest importance, the priority value is 0, the load calculated by equation (3) is also 0, and its sampling rate is not adjustable. After calculating to acquire the load of each of the sampling parameters at the selected sampling rate, the sampling parameters are sorted according to the loads. The sampling parameters may be sorted in order of the loads from large to small, or may be sorted in order of the loads from small to large.

After the sampling parameters are sorted according to the loads, the high-loaded sampling parameters are determined according to the sorting result. In some embodiments, for sorting the sampling parameters in order of the loads from large to small, a threshold n (a natural number) may be set, and first to nth sampling parameters are determined as the high-loaded parameters. In some other embodiments, for sorting the sampling parameters in order of the loads from large to small, a median sampling parameter may be determined first, and sampling parameters over the median sampling parameter are the high-loaded parameters.

Step S240, whether all the sampling parameters have data loss or not is determined, and if at least one of the sampling parameters has data loss, down-sampling is performed on the high-loaded parameters within a range of the configured at least two sampling rates. In this step, if data loss occurs, down-sampling is performed on the high-loaded sampling parameters, which can reduce the total load, avoid data loss, and improve the sampling reliability. Optionally, if no sampling parameter has data loss, up-sampling is performed on the low-loaded parameters within the range of the configured at least two sampling rates. Therefore, performing up-sampling on the low-loaded sampling parameters when no data loss occurs can accelerate the process of sampling the low-loaded sampling parameters and improve the sampling efficiency.

Whether all the sampling parameters have data loss or not is determined, and if at least one of the sampling parameters has data loss, down-sampling is performed on the highest-loaded parameter within the range of the configured at least two sampling rates. Therefore, adjusting the sampling rate of the sampling parameter with the highest load can reduce the complexity and improve the sampling stability. In some embodiments, if no sampling parameter has data loss, up-sampling is performed on the parameter with the lowest load within the range of the configured at least two sampling rates. Therefore, adjusting the sampling rate of the sampling parameter with the lowest load can reduce the complexity and improve the sampling stability.

In some embodiments, the determining whether all the sampling parameters have data loss or not may include: checking a sampling result at a preset period, and if a sampling parameter having no change in state exists during checking, determining that the sampling parameter has data loss. For example, after the intelligent gateway 120 sends the request message to the terminal device 110, the result message is checked at a preset period, where the result message is the sampling result; if the state of the sampling parameters in the result message changes, acquisition of the sampling parameters is completed, if the state of the sampling parameters in the result message does not change, the acquisition of the sampling parameters is not completed, and at the moment, it is determined that the sampling parameter has data loss.

Figure 3:
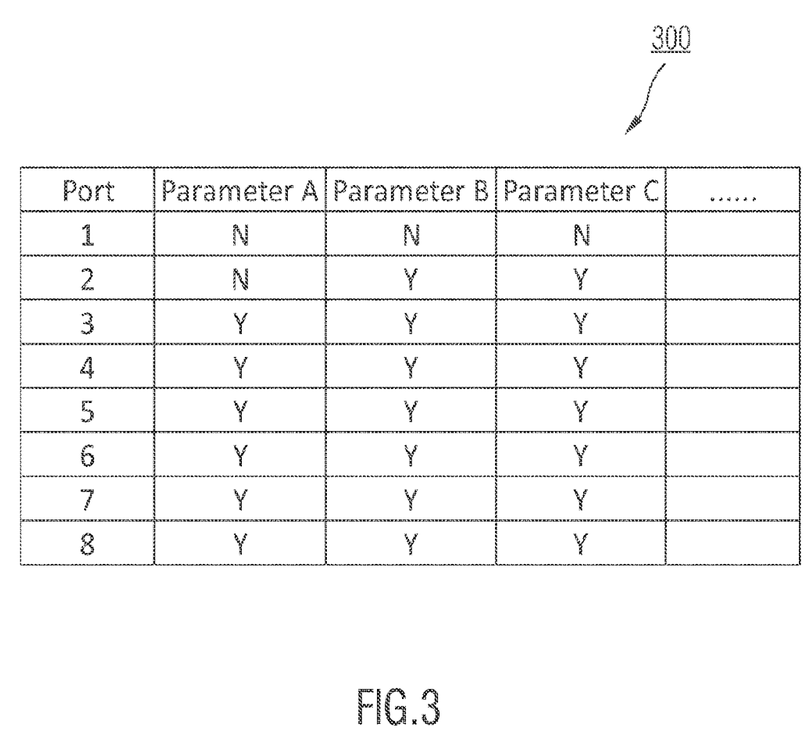
FIG. 3 is a schematic diagram of a sampling result incorporating teachings of the present disclosure.

FIG. 3 is a schematic diagram of a sampling result 300 incorporating teachings of the present disclosure. As shown in FIG. 3, the sampling result 300 is a message state after a preset period, a message collects 8 ports, and each port has the same sampling parameter. According to the message state shown in FIG. 3, states of ports 3-8 all change to Y, indicating that parameter acquisition for these ports has been completed. States of a parameter B and a parameter C of a port 2 become Y, indicating that parameter acquisition of the parameter B and the parameter C of the port 2 has been completed. States of a parameter A of the port 2 and a parameter A, a parameter B and a parameter C of a port 1 remain unchanged and are still N, indicating that these parameters have not completed acquisition, i.e. the sampling result 300 indicates that data loss has occurred.

Flow diagrams are used herein to illustrate operations performed by the methods described herein. It should be understood that the foregoing operations are not necessarily performed precisely in order. Instead, the steps may be processed in reverse order or simultaneously. At the same time, other operations may be added to the processes, or one or more steps may be removed from the processes. When the sampling parameters have data loss, performing down-sampling on the high-loaded parameters within the range of the configured at least two sampling rates can reduce the total load, avoid data loss, and improve the sampling reliability.

Figure 4:
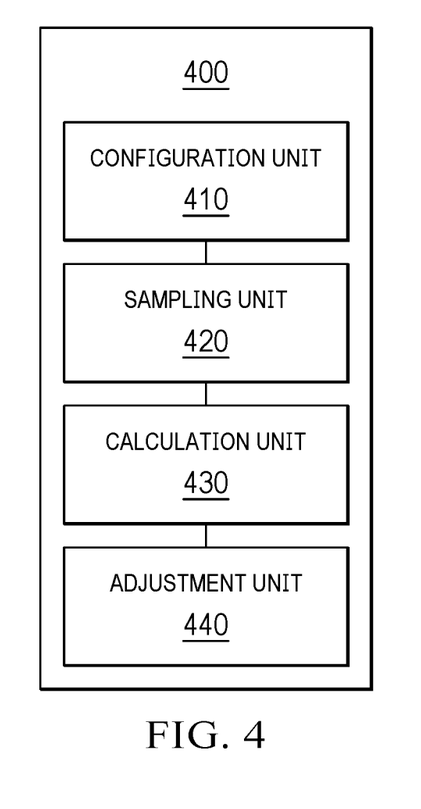
FIG. 4 is a schematic diagram of a multi-parameter dynamic sampling device incorporating teachings of the present disclosure.

FIG. 4 is a schematic diagram of a dynamic sampling device 400 incorporating teachings of the present disclosure. As shown in FIG. 4, the multi-parameter dynamic sampling device 400 includes: a configuration unit 410, configured to configure at least two sampling rates for each of sampling parameters in a plurality of parameters; a sampling unit 420, configured to select one of the at least two sampling rates of each of the sampling parameters to sample the corresponding sampling parameter; a calculation unit 430, configured to calculate a load of each of the sampling parameters at the selected sampling rate, sort the sampling parameters according to the loads, and determine high-loaded sampling parameters according to a sorting result; and an adjustment unit 440, configured to determine whether all the sampling parameters have data loss or not, and if at least one of the sampling parameters has data loss, perform down-sampling on the high-loaded parameters within a range of the configured at least two sampling rates.

In some embodiments, the calculation unit 430 further determines low-loaded sampling parameters according to the sorting result, and if no sampling parameter has data loss, the adjustment unit 440 further performs up-sampling on the low-loaded sampling parameters within the range of the configured at least two sampling rates.

In some embodiments, the configuration unit 410 configuring a priority for each of the sampling parameters includes: configuring the priority for each of the sampling parameters in a message, and fixing a sampling rate of the sampling parameter with the highest priority.

In some embodiments, the configuration unit 410 configuring the priority for each of the sampling parameters includes: acquiring the priorities of the sampling parameters from a cloud server.

In some embodiments, after configuring the at least two sampling rates for each of the sampling parameters, the configuration unit 410 is configured to: calculate a load of each of the sampling parameters at the lowest sampling rate, calculate a total load according to the load of each of the sampling parameters, compare the total load with a preset value, and display overload prompt information if the total load is greater than the preset value.

Optionally, the configuration unit 410 is further configured to: sort the sampling parameters according to the loads at the lowest sampling rate, and display a sorting result of the sampling parameters.

In some embodiments, the adjustment unit 440 determines whether all the sampling parameters have data loss or not, and performs down-sampling on the parameter with the highest load within the range of the configured at least two sampling rates if at least one of the sampling parameters has data loss.

In some embodiments, the adjustment unit 440 determining whether all the sampling parameters have data loss or not includes: checking a sampling result at a preset period, and if a sampling parameter having no change in state exists during checking, determining that the sampling parameter has data loss.

The implementation mode and specific process of the multi-parameter dynamic sampling device 400 may refer to the multi-parameter dynamic sampling method 200 and will not be described in detail herein.

Some embodiments include an intelligent gateway, including a processor, a memory and instructions stored in the memory, where the instructions, when executed by the processor, implement one or more of the methods described herein.

Some embodiments include an Internet of Things system, including an intelligent gateway described herein.

Some embodiments include a computer readable storage medium, having computer instructions stored thereon, where the computer instructions, when executed, implement one or more of the methods described herein.

Some aspects of the method and apparatus may be completely performed by hardware, completely performed by software (including firmware, resident software, micro code, and the like), or may be performed in a combination of hardware and software. Any hardware or software described above may be referred as a "data block", "module", "engine", "unit", "component", or "system". The processor may be one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or a combination thereof. In addition, various aspects of the present invention may be implemented as a computer product in one or more computer readable-media, and the product includes computer readable program code. For example, the computer-readable medium may include, but is not limited to: a magnetic storage device (such as a hard disk, a floppy disk, or a magnetic tape), an optical disc (such as a compact disk (CD), or a digital versatile disc (DVD)), a smartcard and a flash memory device (such as a card, a stick, or a key drive).

The computer-readable medium may include a propagated data signal including computer program code, for example, a propagated data signal being in a baseband or as a part of a carrier. The propagated signal may have a plurality of presentation forms, including an electromagnetic form, an optical form, or any suitable combination thereof. The computer-readable signal medium may be any computer-readable medium other than the computer-readable storage medium. The medium may be connected to an instruction execution system, apparatus, or device to implement a program for use of communication, propagating, or transmission. The program code on the computer-readable medium may be propagated by using any suitable medium, including radio, a cable, a fiber optic cable, a radio-frequency signal, or a similar medium, or any combination of the media above.

It should be understood that, although this specification is described according to each embodiment, each embodiment may not include only one independent technical solution. The description manner of this specification is merely for clarity. This specification should be considered as a whole by a person skilled in the art, and the technical solution in each embodiment may also be properly combined, to form other implementations that can be understood by the person skilled in the art.

The descriptions above are merely exemplary specific implementations of the teachings of the present disclosure, and are not intended to limit the scope thereof. Any equivalent variation, modification, and combination made by a person skilled in the art without departing from the concepts and principles shall fall within the protection scope of the present disclosure.

What is claimed is:

1. A method comprising:
configuring two sampling rates for each sampling parameter in a plurality of parameters associated with a terminal device of an Internet of Things (IoT);
selecting one of the two sampling rates for a respective sampling parameter to sample the corresponding sampling parameter at the terminal device;
calculating a load of each of the sampling parameters at the selected sampling rate, sorting the sampling parameters according to the loads, and determining high-loaded sampling parameters according to a sorting result; and
determining whether each of the sampling parameters has data loss, and if at least one of the sampling parameters has data loss, adjusting the sampling rate of the respective sampling parameter of the terminal device by performing down-sampling on the high-loaded sampling parameters within a range of the configured at least two sampling rates.

2. The method according to claim 1, further comprising:
determining low-loaded sampling parameters according to the sorting result; and
if no sampling parameter has data loss, performing up-sampling on the low-loaded sampling parameters within the range of the configured at least two sampling rates.

3. The method according to claim 1, wherein configuring the priority for each of the sampling parameters comprises:
configuring the priority for each of the sampling parameters; and
fixing a sampling rate of the sampling parameter with the highest priority.

4. The method according to claim 3, wherein configuring the priority for each of the sampling parameters comprises acquiring the priorities of the sampling parameters from a cloud server.

5. The method according to claim 1, wherein after configuring the two sampling rates for each of the sampling parameters, the method further comprises:
calculating the load of each of the sampling parameters at the lowest sampling rate;
calculating a total load according to the load of each of the sampling parameters;
comparing the total load with a preset value; and
displaying overload prompt information if the total load is greater than the preset value.

6. The method according to claim 5, further comprising:
sorting the sampling parameters according to the loads at the lowest sampling rate; and
displaying a sorting result of the sampling parameters.

7. The method according to claim 1, further comprising:
determining whether all the sampling parameters have data loss; and
if at least one of the sampling parameters has data loss, performing down-sampling on the highest-loaded parameter within the range of the configured at least two sampling rates.

8. The method according to claim 1, wherein determining whether all the sampling parameters have data loss comprises:
checking a sampling result at a preset period; and
if a sampling parameter having no change in state exists during checking, determining that the sampling parameter has data loss.

9. A device comprising:
a controller configured to configure two sampling rates for each sampling parameter of a plurality of sampling parameters associated with a terminal device of an Internet of Things (IoT);
wherein the controller selects one of the two sampling rates to sample the respective sampling parameter;
wherein the controller calculates a load of each of the sampling parameters at the selected sampling rate, sort the sampling parameters according to the loads, and determine high-loaded sampling parameters according to a sorting result; and
wherein the controller determines whether all the sampling parameters have data loss, and if at least one of the sampling parameters has data loss, adjusts the sampling rate of the respective sampling parameter of the terminal device by performing down-sampling on the high-loaded sampling parameters within a range of the configured at least two sampling rates.

10. The device according to claim 9, wherein the calculation unit is further configured to determine low-loaded sampling parameters according to the sorting result; and
if no sampling parameter has data loss, the adjustment unit further performs up-sampling on the low-loaded sampling parameters within the range of the configured at least two sampling rates.

11. The device according to claim 9, wherein configuring the priority for each of the sampling parameters comprises:
configuring the priority for each of the sampling parameters; and
fixing a sampling rate of the sampling parameter with the highest priority.

12. The device according to claim 11, wherein configuring the priority for each of the sampling parameters comprises acquiring the priorities of the sampling parameters from a cloud server.

13. The device according to claim 9, wherein after configuring the at least two sampling rates for each of the sampling parameters, the configuration unit (410) is configured to:
calculate a load of each of the sampling parameters at the lowest sampling rate;
calculate a total load according to the load of each of the sampling parameters;
compare the total load with a preset value; and
display overload prompt information if the total load is greater than the preset value.

14. The device according to claim 13, wherein the configuration unit is further configured to:
sort the sampling parameters according to the loads at the lowest sampling rate; and
display a sorting result of the sampling parameters.

15. The device according to claim 9, wherein the adjustment unit determines whether all the sampling parameters have data loss or not, and performs down-sampling on the highest-loaded parameter within the range of the configured at least two sampling rates if at least one of the sampling parameters has data loss.

16. The device according to claim 9, wherein determining whether all the sampling parameters have data loss comprises:
checking a sampling result at a preset period; and if a sampling parameter having no change in state exists during checking, determining that the sampling parameter has data loss.

17. An intelligent gateway connected to an Internet of Things (IoT) comprising:
    a processor;
    a memory storing a set of instructions;
    wherein the instructions, when executed by the processor, cause the processor to:
    configure two sampling rates for each sampling parameter in a plurality of parameters associated with a terminal device connected to the IoT;
    select one of the two sampling rates for a respective sampling parameter to sample the corresponding sampling parameter;
    calculate a load of each of the sampling parameters at the selected sampling rate, sorting the sampling parameters according to the loads, and determining high-loaded sampling parameters according to a sorting result; and
    determine whether all the sampling parameters have data loss, and if at least one of the sampling parameters has data loss, adjusting the sampling rate of the respective sampling parameter of the terminal device performing down-sampling on the high-loaded sampling parameters within a range of the configured at least two sampling rates.

* * * * *